June 24, 1930.  J. L. STOVER  1,767,717
SPRING SHACKLE
Filed March 21, 1928
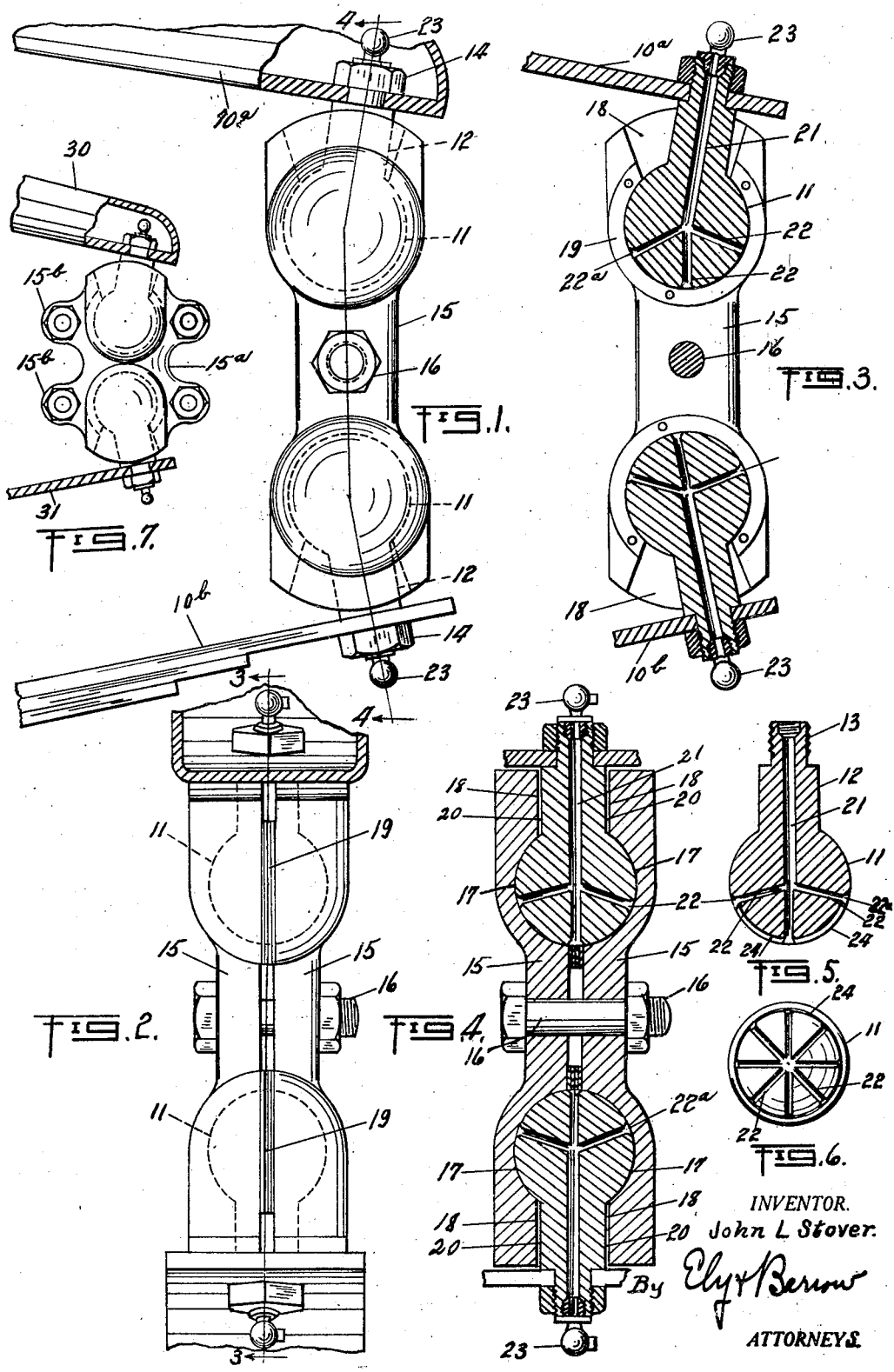
INVENTOR.
John L. Stover.
By Ely F Berrow
ATTORNEYS Patented June 24, 1930

1,767,717

UNITED STATES PATENT OFFICE

JOHN L. STOVER, OF KENMORE, OHIO

SPRING SHACKLE

Application filed March 21, 1928. Serial No. 263,277.

This invention relates to spring shackles for vehicles.

The general purposes of the invention are to provide an improved spring shackle providing a universal connection between the spring and frame limited in its action to secure the most efficient results and capable of adjustment to take up wear and also to provide an efficient lubricating arrangement for shackles.

The foregoing and other purposes are attained in the shackles illustrated in the accompanying drawings and described below. It is to be understood that the invention is not limited to the specific form thereof shown and described.

Of the accompanying drawings,

Figure 1 is a side elevation of a shackle embodying the invention shown in use between the rear end of the chassis and the spring of a vehicle;

Figure 2 is an end elevation thereof;

Figure 3 is a section on line 3—3 of Figure 2;

Figure 4 is a section on line 4—4 of Figure 1;

Figure 5 is a detail section of a modified form of ball for the universal connections;

Figure 6 is an end elevation thereof; and

Figure 7 is a reduced side elevation of a shackle embodying the invention which is adapted for use between the front end of the chassis and the spring of a vehicle.

Referring to the drawings, the numeral 10$^a$ designates the rear end of a chassis member of a vehicle and 10$^b$ designates the rear spring of said vehicle between which the improved shackle embodying the invention is employed.

This shackle comprises ball members 11, 11 having shanks 12, 12 formed with reduced portions 13, 13 adapted to be extended through vehicle chassis member 10$^a$ and spring 10$^b$ and to be secured thereto as by nuts 14, 14 threaded on said shanks. These members preferably are made of comparatively hard, wear-resisting metal such as hardened steel.

A pair of shackle plates 15, 15 are arranged to be secured together as by a bolt 16 and are formed with mating, spherical cavities 17, 17 at each end thereof for fitting onto balls 11 and also with mating slots 18, 18 at each end thereof through which the shanks 12 of the balls extend. Shims 19, 19 are provided between plates 15 to permit adjustment for wear. Plates 15 preferably are of metal somewhat less resistant to wear than the balls 11 so that the plates will wear rather than the balls, the plates being easily adjustable by removal of the shims.

The slot 18 defined in the shackle by the plates is longitudinally elongated as shown to permit the usual oscillatory action of the shackle and slight lateral clearance is also provided between the side walls of these slots and the shanks 12 as indicated at 20, 20 to permit a limited amount of lateral play.

The lubricating system for the shackle consists in duct 21 formed through each shank 12 and extending into each ball 11, said duct having one or more branches 22, 22 extending to the periphery of each ball so as to thoroughly distribute the lubricant between the surface of the ball and the surface of its socket, the outer ends of branches 22 preferably being countersunk as indicated at 22$^a$ to facilitate flow of the lubricant from the branch ducts. A lubricant supply fitting 23 of any suitable type may be secured to the ends of shanks 12 to supply lubricant to ducts 21 and 22.

As illustrated in Figures 5 and 6, freer distribution of lubricant may be effected by extending grooves 24, 24 from about the surfaces of balls 12 from branch ducts 22, these grooves preferably interconnecting with the several branch ducts as shown.

A suitable shackle embodying the invention for use as a front spring connection is shown in Figure 7, the frame member being indicated by the numeral 30 and the spring by the numeral 31. In this form of shackle, instead of bolting the shackle plates 15$^a$, 15$^a$ at a point intermediate the balls as in the form previously described, these plates are formed with mating lugs 15$^b$, 15$^b$ adapted to be bolted together, whereby a short shackle having the advantages of the invention can be obtained. Otherwise this form of the invention is similar to that used on the rear spring.

It will appear from the foregoing that a simple, effective, adjustable shackle has been devised and one which is capable of effective lubrication. Obviously modifications of this invention may be resorted to without departing from the spirit thereof or the scope of the appended claims.

What is claimed is:—

1. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend with slight lateral clearance to permit free oscillation of the shackle and shims between said plates whereby the plates may be adjustably fitted to said ball members, said ball members having ducts extending therein through said shanks and branch ducts extending from the first named ducts to the surfaces of the balls to supply lubricant thereto, said branch ducts being enlarged at their outer ends.

2. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend with slight lateral clearance to permit free oscillation of the shackle and shims between said plates whereby the plates may be adjustably fitted to said ball members, said ball members having ducts extending therein through said shanks and branch ducts extending from the first named ducts to the surfaces of the balls to supply lubricant thereto.

3. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend and shims between said plates whereby the plates may be adjustably fitted to said ball members, said ball members having ducts extending therein through said shanks and branch ducts extending from the first named ducts to the surfaces of the balls to supply lubricant thereto.

4. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend, said ball members having ducts extending therein through said shanks and branch ducts extending from the first named ducts to the surfaces of the balls to supply lubricant thereto.

5. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend with slight lateral clearance to permit free oscillation of the shackle, said ball members having ducts extending therein through said shanks and branch ducts extending from the first named ducts to the surfaces of the balls to supply lubricant thereto.

6. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend with slight lateral clearance to permit free oscillation of the shackle and shims between said plates whereby the plates may be adjustably fitted to said ball members.

7. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend and shims between said plates whereby the plates may be adjustably fitted to said ball members.

8. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend.

9. A spring shackle for vehicles comprising ball members having shanks adapted for attachment respectively to the chassis and spring of a vehicle, and shackle plates having mating sockets therein at both ends, said plates being adapted to be secured together about said balls, said plates also having mating grooves in the ends thereof for defining elongated slots through which said shanks extend with slight lateral clearance to permit free oscillation of the shackle.

JOHN L. STOVER.